(12) United States Patent
Marciel et al.

(10) Patent No.: US 8,024,664 B1
(45) Date of Patent: Sep. 20, 2011

(54) CO-BRANDS FOR USER INTERFACE IN TRAVEL BOOKING

(75) Inventors: Valentine Marciel, Honolulu, HI (US); Sahil Sabharwal, Foster City, CA (US)

(73) Assignee: Ezrez Software Inc., Honolulu, HI (US)

( * ) Notice: Subject to any disclaimer, the term of this patent is extended or adjusted under 35 U.S.C. 154(b) by 784 days.

(21) Appl. No.: 11/752,832

(22) Filed: May 23, 2007

Related U.S. Application Data

(60) Provisional application No. 60/808,274, filed on May 24, 2006.

(51) Int. Cl.
*G06F 3/00* (2006.01)

(52) U.S. Cl. ............. 715/760; 715/744; 705/5; 705/26; 705/28

(58) Field of Classification Search .................. 715/760, 715/716, 717, 742, 744, 764, 765; 705/5, 705/6, 14, 26, 28, 39–44
See application file for complete search history.

(56) References Cited

U.S. PATENT DOCUMENTS

| | | | |
|---|---|---|---|
| 5,948,040 A * | 9/1999 | DeLorme et al. ............. 701/201 |
| 6,035,288 A | 3/2000 | Solomon | |
| 6,076,070 A | 6/2000 | Stack | |
| 6,229,534 B1 | 5/2001 | Gerra | |
| 6,360,205 B1 | 3/2002 | Iyengar | |
| 6,377,932 B1 | 4/2002 | DeMarcken | |
| 6,442,526 B1 | 8/2002 | Vance | |
| 6,622,084 B2 | 9/2003 | Cardno | |
| 7,050,986 B1 | 5/2006 | Vance | |
| 7,069,228 B1 | 6/2006 | Rose | |
| 7,092,892 B1 | 8/2006 | Sobalvarro | |
| 7,136,821 B1 * | 11/2006 | Kohavi et al. ............. 705/5 |
| 7,308,420 B1 | 12/2007 | Storch | |
| 7,328,166 B1 | 2/2008 | Geoghegan | |
| 7,424,441 B2 | 9/2008 | George | |
| 7,539,620 B2 | 5/2009 | Winterton | |
| 2001/0021912 A1 | 9/2001 | Demarcken | |
| 2002/0010686 A1 | 1/2002 | Whitesage | |
| 2002/0077871 A1 | 6/2002 | Udelhoven | |
| 2002/0152100 A1 | 10/2002 | Chen | |
| 2003/0023463 A1 | 1/2003 | Dombroski | |
| 2003/0036930 A1 | 2/2003 | Matos | |
| 2003/0040946 A1 | 2/2003 | Sprenger | |
| 2003/0061145 A1 | 3/2003 | Norrid | |
| 2003/0120523 A1 | 6/2003 | Jafri | |
| 2003/0120526 A1 | 6/2003 | Altman | |
| 2003/0126077 A1 | 7/2003 | Kantor | |
| 2003/0191725 A1 | 10/2003 | Ratliff | |
| 2004/0039617 A1 * | 2/2004 | Maycotte et al. ............. 705/5 |
| 2004/0049541 A1 | 3/2004 | Swahn | |

(Continued)

*Primary Examiner* — Weilun Lo
*Assistant Examiner* — Rashedul Hassan
(74) *Attorney, Agent, or Firm* — Jeffrey Schox

(57) ABSTRACT

Co-brands, virtual wrappers for web sites that allow clients to expand client inventories across different web sites, are disclosed. Different types of travel inventory can be provided across these web sites. A client can create different URLs, domains, look and feel, product filters, pricing rules, business logic, payment methods, languages, currencies, etc. off a single instance. A client can create a co-brand and, using an administrator application, configure its settings to target specific geographic locations, targets markets or even themes. Additionally, co-brands are used to allow third party vendors to direct traffic to client sites. Co-brand tools are designed to make items such as navigation, images, buttons, domain names, colors, fonts, languages and currencies. Co-brands make it easier for travel companies to have sites based on demographics, destination, and events that can lead to greater adoption and conversion.

21 Claims, 4 Drawing Sheets

U.S. PATENT DOCUMENTS

| | | |
|---|---|---|
| 2004/0249681 A1* | 12/2004 | Staten et al. ............... 705/5 |
| 2004/0249801 A1* | 12/2004 | Kapur ....................... 707/3 |
| 2005/0004818 A1* | 1/2005 | Liman ....................... 705/5 |
| 2005/0021424 A1 | 1/2005 | Lewis |
| 2005/0033616 A1* | 2/2005 | Vavul et al. ............... 705/5 |
| 2005/0086129 A1* | 4/2005 | Patullo et al. ............. 705/27 |
| 2005/0144048 A1* | 6/2005 | Belanger et al. ........... 705/5 |
| 2006/0053052 A1 | 3/2006 | Baggett |
| 2006/0085741 A1 | 4/2006 | Weiner |
| 2006/0259335 A1 | 11/2006 | La Macchia |
| 2007/0143155 A1* | 6/2007 | Whitsett et al. ........... 705/5 |
| 2007/0192186 A1* | 8/2007 | Greene et al. ............. 705/14 |
| 2008/0021748 A1* | 1/2008 | Bay et al. .................. 705/6 |
| 2008/0046298 A1* | 2/2008 | Ben-Yehuda et al. ..... 705/6 |
| 2009/0182588 A1 | 7/2009 | Ashby |

* cited by examiner

CO-BRANDS FOR USER INTERFACE IN TRAVEL BOOKING

CROSS-REFERENCE TO RELATED APPLICATIONS

This application claims priority to co-pending provisional U.S. patent application entitled "Co-Brands for User Interface in Travel Booking", Ser. No. 60/808,274, filed on May 24, 2006.

BACKGROUND

1. Field

The present invention relates to online travel booking, and more particularly to the granularity of customization of web sites for online travel booking.

2. Related Art

Online travel booking is well known in the art. Users can access travel booking web sites, perform searches for various travel services, select desired itinerary, and book the itinerary. However, conventional travel booking web sites are static. They do not change for different targets, and if customization is provided, such customization tends to be specific to a web site or only at a high level. Granular customization is not provided.

Accordingly, there exists a need for dynamic virtual wrappers for travel booking web sites. These wrappers should provide customization at enough granularity to allow clients to create different interfaces across target markets off a single instance. The present invention addresses such a need.

SUMMARY

Co-brands, virtual wrappers for web sites that allow clients to expand client inventories across different web sites, are disclosed. A client can create different URLs, domains, look and feel, product filters, pricing rules, business logic, payment methods, languages, currencies, etc. off a single instance. A client can create a co-brand and, using an administrator application, configure its settings to target specific geographic locations, targets markets or even themes, such as "Romantic" or "Tropical". Additionally, co-brands are used to allow third party vendors to direct traffic to client sites. Co-brand tools are designed to make items such as navigation, images, buttons, domain names, colors, fonts, languages and currencies—this means that an average computer user can create new sites with different marketing angles with simple upload tools, as opposed to requiring the assistance of more experienced web site designers who need to create new wireframes or code. Co-brands make it easier for travel companies to have sites based on demographics (e.g. teen vs. baby boomer), destination (e.g. Las Vegas vs. Hawaii), events (e.g. consumer goods convention vs. a sales incentive cruise) that can lead to greater adoption and conversion.

BRIEF DESCRIPTION OF DRAWINGS

FIG. 5 illustrates the setting of the booking engine for a co-brand in accordance with the present invention.

FIG. 6 illustrates the associating of contract groups with a co-brand in accordance with the present invention.

FIG. 7 illustrates the setting of a payment gateway for a co-brand in accordance with the present invention.

DETAILED DESCRIPTION

Co-brands are virtual wrappers or skins for web sites that allow clients to expand client inventories across different web sites. Different types of travel inventory can be provided across these web sites. A client can create different URLs, domains, look and feel, product filters, pricing rules, business logic, payment methods, languages, currencies, etc. off a single instance. A client can create a co-brand and, using an administrator application (such as in a computer readable medium with program instructions), configure its settings to target specific geographic locations, targets markets or even themes, such as "Romantic" or "Tropical". Additionally, co-brands are used to allow third party vendors to direct traffic to client sites. For example, co-brands allow a tour operator such as American Airlines Vacations™, who specializes in multiple destinations, to create numerous sub-sites off of their default site, specifying the Caribbean, Hawaii, Europe, or New York. Each sub site can have graphics, colors, advertising, links and marketing tools specialized towards each destination. A credit card company such as American Express™ can offer different look and feel sites targeted to their Centurion, Platinum or Classic card holders.

Figure 1:
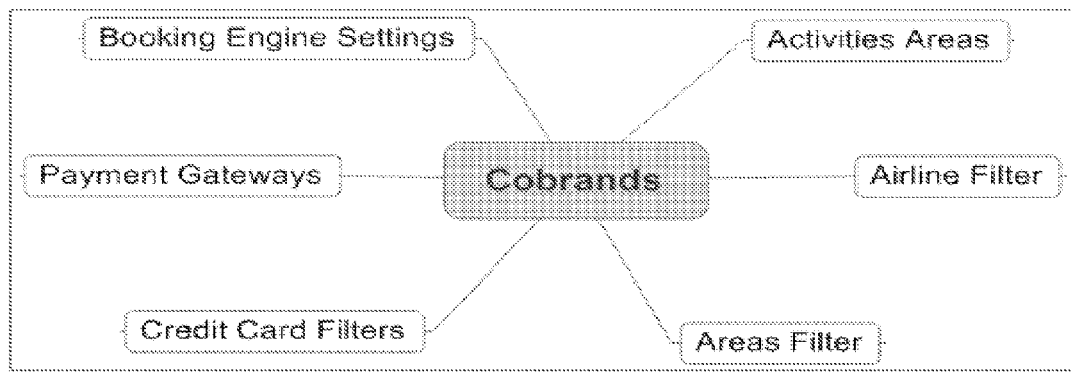
FIG. 1 illustrates an embodiment of co-brand functionalities provided in accordance with the present invention.

FIG. 1 illustrates an embodiment of co-brand functionalities provided in accordance with the present invention. The functionalities include activities areas, airlines filters, area filters, booking engine settings, payment gateways, and credit card filters. Each of these functionalities is described further below.

Figure 2:
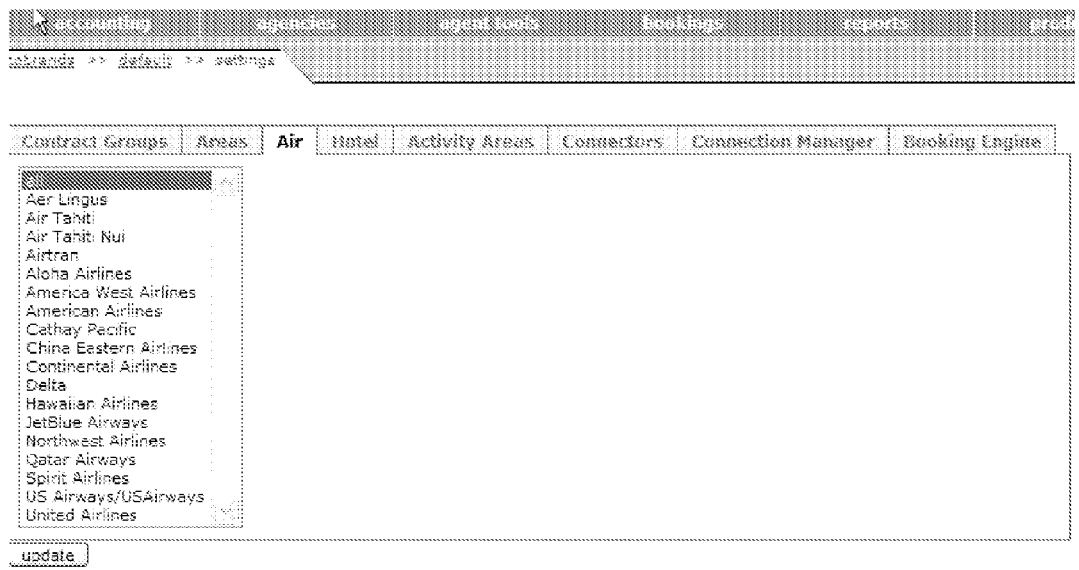
FIG. 2 illustrates the setting of airline filters for a co-brand in accordance with the present invention.

FIG. 2 illustrates the setting of airline filters for a co-brand in accordance with the present invention. In one embodiment, a list of existing airline filters is displayed. One or more of the airline filters can be selected, where itinerary search results are filtered to target the selected airlines.

Figure 3:
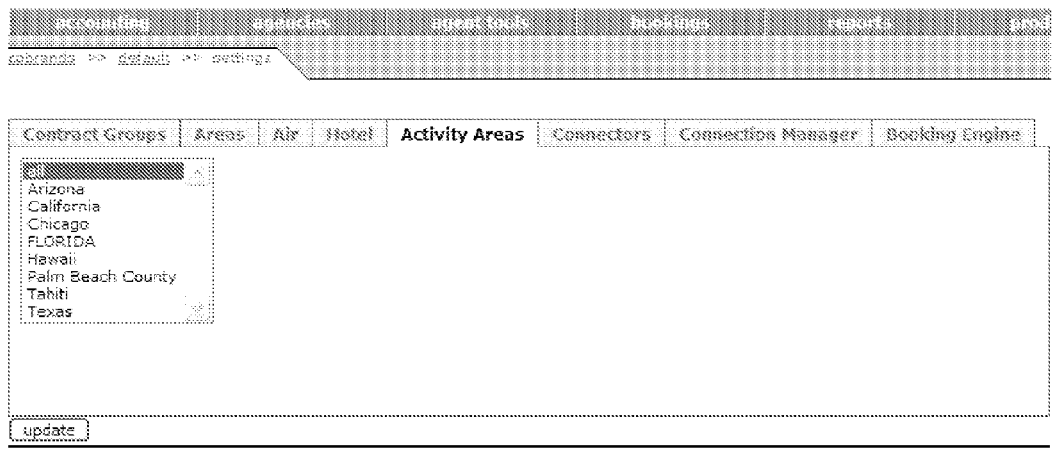
FIG. 3 illustrates the setting of activity filters for a co-brand in accordance with the present invention.

FIG. 3 illustrates the setting of activity filters for a co-brand in accordance with the present invention. In one embodiment, a list of geographical locations is displayed. One or more of the locations can be selected, where itinerary search results are filtered to target the selected geographic locations.

Figure 4:
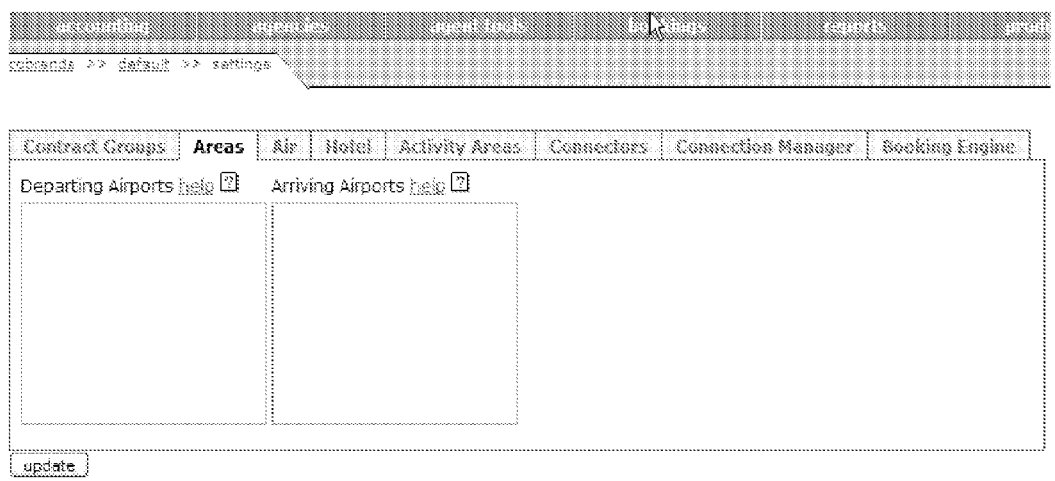
FIG. 4 illustrates the setting of area filters for a co-brand in accordance with the present invention.

FIG. 4 illustrates the setting of area filters for a co-brand in accordance with the present invention. In one embodiment, a list of departing and/or arriving airports is displayed. One or more of the airports can be selected, where itinerary search results are filtered to target the selected airports.

The airline, activity, and area filters can be set according to a marketing objective of the client.

Figures 5, 6:
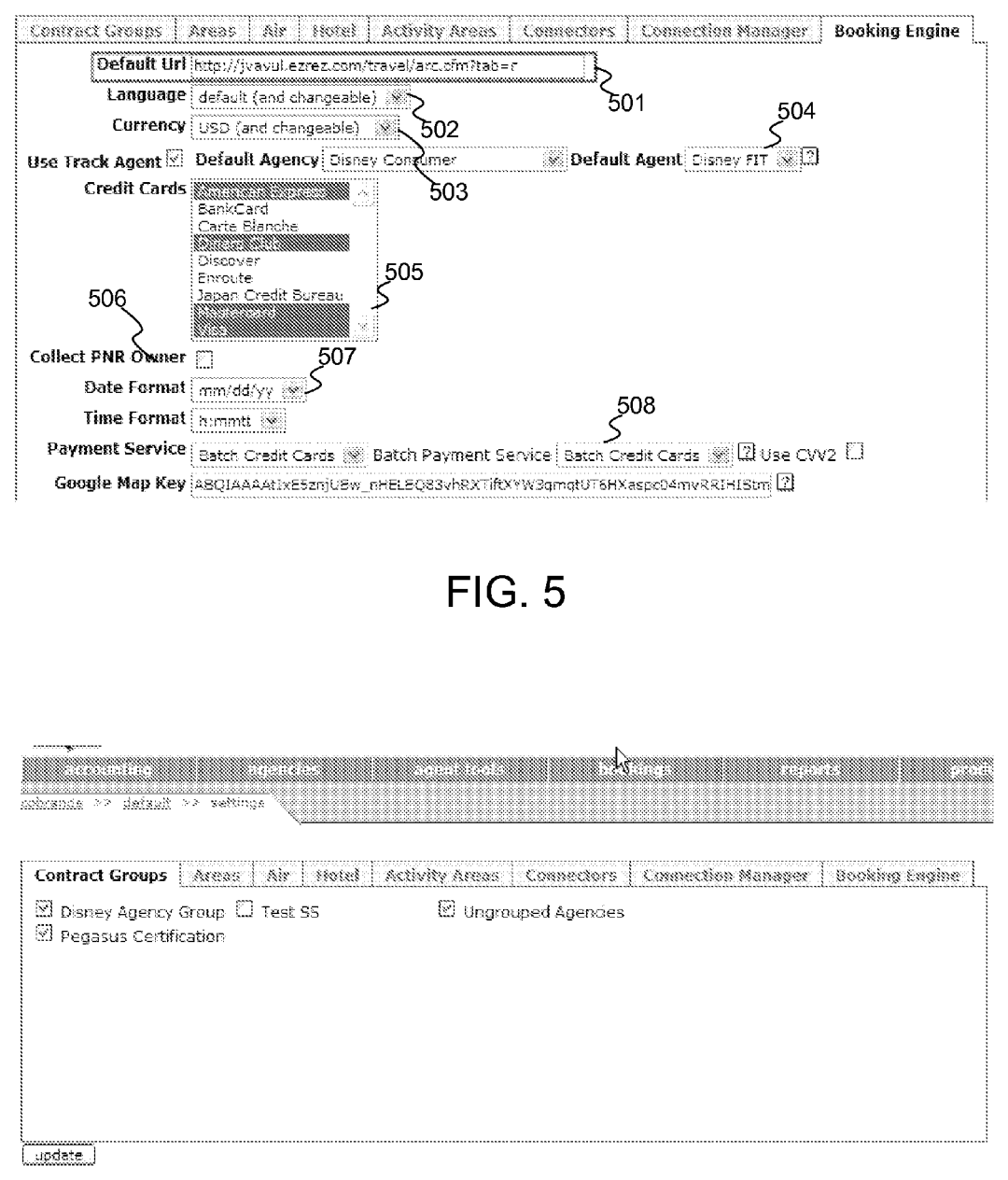

FIG. 5 illustrates the setting of the booking engine for a co-brand in accordance with the present invention. In one embodiment, a default URL 501 can be defined for the co-brand. A language 502, currency 503, and agent track 504 can also be selected for the co-brand, allowing for a genuine international tool. For example, a client can define multiple co-brands, with different language, currency, and agent track settings, for different geographic locations. Further, a client can select credit card settings 505 to restrict credit cards used for payments on the web site. For example, if there is an American Bank promotion, and a co-brand is set up, the customer can only use American Express Card to make the payment on the co-brand.

Further settings for the booking engine include the selection of the collect PNR Owner 506 setting, the date and time format at the co-brand level 507. The payment service and Google™ map key 508 can also be set on the co-brand level. The PNR Owner 506 makes it an option to collect the traveler name or the name of the person making the reservation, e.g. an exec assistant. For example, Jet Blue™ converted labels to say "Who's Flying?" and "Who's Buying?"

To provide further flexibility, contract groups can be defined and associated with a co-brand. A contract group allows for specific functions, such as inclusion/exclusion of connector sources or suppliers, different pricing rules, etc. Multiple contract groups can be associated with a single co-brand, or a single contract group can be associated with multiple co-brands. Contract groups are described further in co-pending U.S. patent application entitled "Multiple Client Instance for Dynamic Travel Booking", Ser. No. 11/752,842, filed on May 23, 2007. This application is hereby incorporated by reference.

FIG. 6 illustrates the associating of contract groups with a co-brand in accordance with the present invention. In the illustrated example, contract groups "Disney Agency Group", "Pegasus Certification", and "Ungrouped Agencies" are associated with the co-brand.

Figure 7:
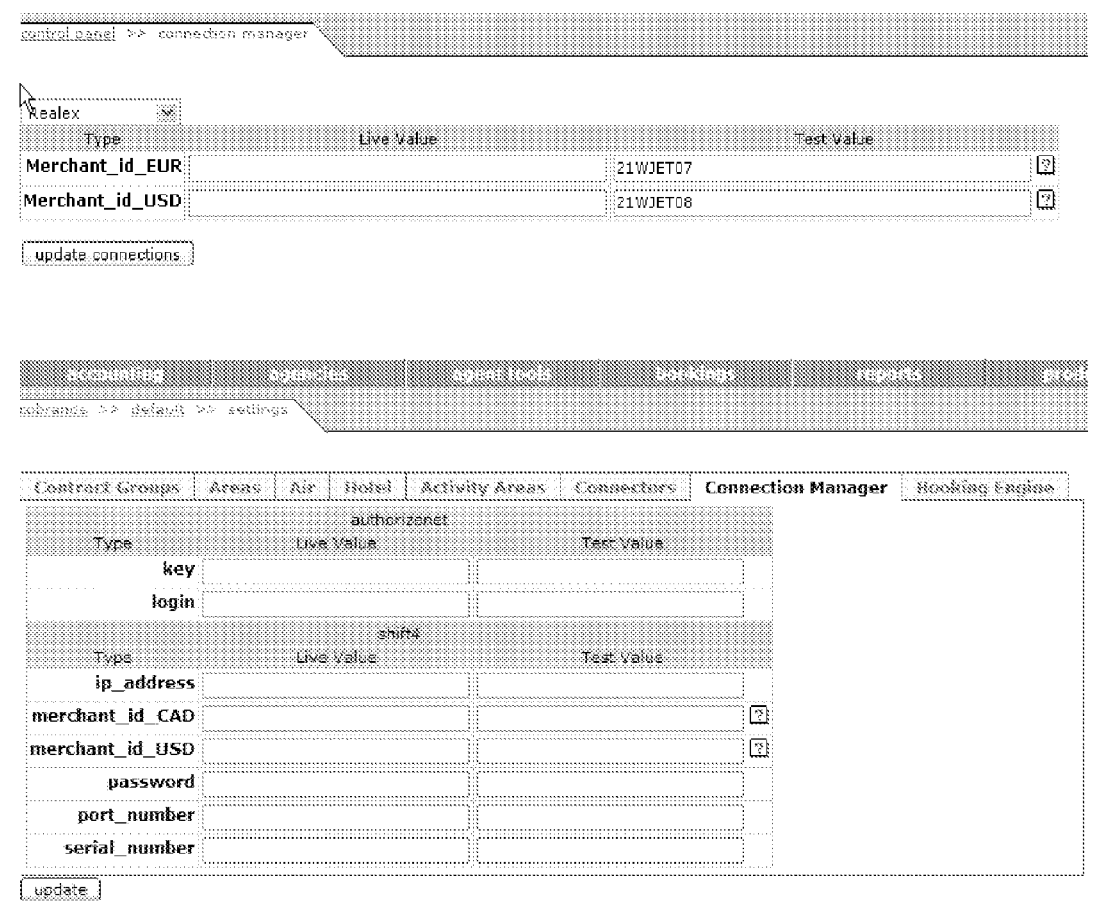

FIG. 7 illustrates the setting of a payment gateway for a co-brand in accordance with the present invention. A connection to a payment gateway, through which payment for an itinerary is processed, is first defined using a connection manager. Credentials for the payment gateway can then be set and saved at the co-brand level.

Co-brands, dynamic virtual wrappers for travel booking web sites, have been disclosed. With co-brands, a client can create different URLs, domains, look and feel, product filters, pricing rules, business logic, payment methods, languages, currencies, etc. off a single instance. A client can create a co-brand and, using an administrator application, configure its settings to target specific geographic locations, targets markets or even themes, such as "Romantic" or "Tropical". Additionally, co-brands are used to allow third party vendors to direct traffic to client sites. Co-brand tools are designed to make items such as navigation, images, buttons, domain names, colors, fonts, languages and currencies—this means that an average computer user can create new sites with different marketing angles with simple upload tools, as opposed to requiring the assistance of more experienced web site designers who need to create new wireframes or code. Co-brands make it easier for travel companies to have sites based on demographics (e.g. teen vs. baby boomer), destination (e.g. Las Vegas vs. Hawaii), events (e.g. consumer goods convention vs. a sales incentive cruise) that can lead to greater adoption and conversion.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description.

We claim:

1. A method for allowing a travel company client to present various travel inventory types through a plurality of online travel sub-websites, comprising:

defining a plurality of co-brands for an existing default online travel website through use of a single instance of an administrator application, wherein each co-brand is a virtual wrapper or skin that customizes a respective one of the plurality of online travel sub-websites presented by the existing default online travel website, the administrator application utilizing information from the existing default online travel website to display an interface for:

allowing the travel company client to define a default URL for defining each co-brand; and allowing the travel company client to configure respective co-brand settings for each co-brand, including receiving configurations from the travel company client for:

defining a set of one or more targeted geographic locations;

defining a language for each of the targeted geographic locations; and defining a currency for each of the targeted geographic locations; and providing a respective travel inventory search result to a user based on the respective co-brand settings.

2. The method of claim 1, wherein allowing the travel company client to configure respective co-brand settings includes receiving configurations from the travel company client for defining an airline filter that targets selected airlines, and wherein providing a travel inventory search result includes providing the targeted airlines.

3. The method of claim 1, wherein allowing the travel company client to configure respective co-brand settings further includes receiving configurations from the travel company client for defining an activity filter corresponding to targeted geographic locations, and wherein providing a travel inventory search result includes providing activities filtered by the targeted geographic locations.

4. The method of claim 1, wherein allowing the travel company client to configure respective co-brand settings further includes receiving configurations from the travel company client for defining an area filter, wherein providing a travel inventory search result includes providing targeted airports filtered by the area filter.

5. The method of claim 1, wherein allowing the travel company client to configure respective co-brand settings further includes receiving configurations from the travel company client for defining an agent track.

6. The method of claim 1, wherein allowing the travel company client to configure respective co-brand settings further includes receiving configurations from the travel company client for defining settings for a booking engine.

7. The method of claim 6, wherein the settings for the booking engine comprise a selection of collect PNR owner setting, a date and time format, or a payment service.

8. The method of claim 1, wherein allowing the travel company client to configure respective co-brand settings further includes receiving configurations from the travel company client for defining settings for a payment gateway, through which payment for the travel itinerary is processed.

9. The method of claim 1, wherein at least one of the co-brands is associated with a contract group, wherein the contract group comprises settings for travel inventory access and pricing.

10. The method of claim 1 wherein allowing the travel company client to configure respective settings for each co-brand includes defining the co-brand settings to target at least one of: target markets, target themes, specific customer demographics, specific destinations, and events.

11. A non-transitory computer readable medium with program instructions for allowing a travel company client to present various travel inventory types to a user through a plurality of online travel sub-websites, comprising instructions for:
    defining a plurality of co-brands for an existing default online travel website through use of a single instance of an administrator application, wherein each co-brand is a virtual wrapper or skin that customizes a respective one of the plurality of online travel sub-websites presented by the existing default online travel website, the administrator application utilizing information from the existing default online travel website to display an interface for:
        allowing the travel company client to define a default URL for defining each co-brand;
        allowing the travel company client to configure respective co-brand settings for each co-brand, including receiving configurations from the travel company client for:
            defining a set of one or more geographic locations;
            defining a language for each of the targeted geographic locations; and
            defining a currency for each of the targeted geographic locations; and
    providing a respective travel inventory search result to the user based on the co-brand settings.

12. The medium of claim 11, wherein allowing the travel company client to configure respective co-brand settings includes receiving configurations from the travel company client for an airline filter that targets selected airlines, and wherein providing a travel inventory search result includes providing the targeted airlines.

13. The medium of claim 11, wherein allowing the travel company client to configure respective co-brand settings further includes receiving configurations from the travel company client for defining an activity filter, and wherein providing a travel inventory search result includes providing activities filtered by the targeted geographic locations.

14. The medium of claim 11, wherein allowing the travel company client to configure respective co-brand settings further includes receiving configurations from the travel company client for defining an area filter, wherein providing a travel inventory search result includes providing targeted airports filtered by the area filter.

15. The medium of claim 11, wherein allowing the travel company client to configure respective co-brand settings further includes receiving configurations from the travel company client for defining an agent track.

16. The medium of claim 11, wherein allowing the travel company client to configure respective co-brand settings further includes receiving configurations from the travel company client for defining settings for a booking engine.

17. The medium of claim 16, wherein the settings for the booking engine comprise a selection of collect PNR setting, a date and time format, or a payment service.

18. The medium of claim 11, wherein allowing the travel company client to configure respective co-brand settings further includes receiving configurations from the travel company client for defining settings for a payment gateway, through which payment for the travel itinerary is processed.

19. The medium of claim 11, wherein at least one of the co-brands is associated with a contract group, wherein the contract group comprises settings or travel itinerary access and pricing.

20. The non-transitory computer readable medium of claim 11 further comprising instructions for allowing the travel company client to configure respective settings for each co-brand such that each co-brand targets at least one of: specific geographic locations, target markets, themes, specific customer demographics, specific destinations, and events.

21. A method for allowing a travel company client to present various travel inventory types through a plurality online travel sub-websites, comprising:
    defining a plurality of co-brands for an existing default online travel website through use of a single instance of an administrator application, wherein each co-brand is a virtual wrapper or skin that customizes a respective one of the plurality of online travel sub-websites presented by the existing default online travel website, the administrator application utilizing information from the existing default online travel website to display an interface for:
        allowing the travel company client to define a default URL for defining each co-brand; and
        allowing the travel company client to configure respective co-brand settings for each co-brand, including receiving configurations from the travel company client for:
            defining a set of one or more targeted geographic locations;
            defining a language for each of the targeted geographic locations;
            defining a currency for each of the targeted geographic locations;
            defining an airline filter that targets selected airlines;
            defining an activity filter corresponding to at least one of the targeted geographic locations;
            defining settings for a booking engine; and
            defining settings for a payment gateway; and
    providing a respective travel inventory search result to a user based on the respective co-brand settings, including:
        providing the targeted airlines; and
        providing activities filtered by the activity filter.

\* \* \* \* \*